(12) United States Patent
Hofmann et al.

(10) Patent No.: US 7,891,880 B2
(45) Date of Patent: Feb. 22, 2011

(54) RADIAL ROLLING BEARING, ESPECIALLY SINGLE-ROW DEEP GROOVE ROLLING BEARING

(75) Inventors: Heinrich Hofmann, Schweinfurt (DE); Horst Doppling, Herzogenaurach (DE); Andreas Bohr, Herzogenaurach (DE); Rainer Eidloth, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 383 days.

(21) Appl. No.: 12/096,646

(22) PCT Filed: Dec. 5, 2006

(86) PCT No.: PCT/DE2006/002155
§ 371 (c)(1),
(2), (4) Date: Jun. 9, 2008

(87) PCT Pub. No.: WO2007/065415
PCT Pub. Date: Jun. 14, 2007

(65) Prior Publication Data
US 2008/0304781 A1 Dec. 11, 2008

(30) Foreign Application Priority Data
Dec. 10, 2005 (DE) .................. 10 2005 059 032

(51) Int. Cl.
*F16C 33/36* (2006.01)
*F16C 33/46* (2006.01)
(52) U.S. Cl. .................. 384/568; 384/523; 384/533; 384/572
(58) Field of Classification Search .......... 384/523–534, 384/572–580, 568, 450
See application file for complete search history.

(56) References Cited

U.S. PATENT DOCUMENTS

| | | | | |
|---|---|---|---|---|
| 1,415,420 A | * | 5/1922 | Weibull | 384/578 |
| 1,438,654 A | | 12/1922 | Leon | |
| 1,766,440 A | * | 6/1930 | Leon | 384/558 |
| 1,790,869 A | * | 2/1931 | Leon | 384/574 |
| 2,068,198 A | | 1/1937 | Seifarth | |
| 3,620,585 A | * | 11/1971 | Anderson et al. | 384/491 |
| 3,905,660 A | * | 9/1975 | Fletcher et al. | 384/544 |
| 5,735,614 A | * | 4/1998 | Isogawa | 384/476 |

(Continued)

FOREIGN PATENT DOCUMENTS

DE 168 499 C 3/1906

(Continued)

*Primary Examiner*—Thomas R Hannon
(74) *Attorney, Agent, or Firm*—Lucas & Mercanti LLP

(57) ABSTRACT

A radial rolling bearing, which has an outer bearing ring, an inner bearing ring, and rollers, which are arranged between the bearing rings and held at uniform distances from one another in a peripheral direction by a bearing cage in individual cage pockets. The rollers are spherical disks that have parallel lateral surfaces which are symmetrically flattened from a basic spherical shape and which roll in groove-type raceways with their faces. The raceways are incorporated into the inner face of the outer bearing ring and the outer face of the inner bearing ring. The rollers are axially guided between the bearing rings via two low-friction line contacts between lateral surfaces and the longitudinal webs of the cage pockets. The rollers are configured to have a defined degree of freedom for self-alignment to the pressure angle of the radial rolling bearing.

6 Claims, 3 Drawing Sheets

U.S. PATENT DOCUMENTS 6,682,224 B2 * 1/2004 Ooitsu et al. ................ 384/527

FOREIGN PATENT DOCUMENTS

| | | | |
|---|---|---|---|
| DE | 431471 C | 7/1926 |
| DE | 43 34 195 A1 | 3/1994 |
| GB | 317407 A | 8/1929 |
| JP | 2003148480 A | 5/2003 |

* cited by examiner

RADIAL ROLLING BEARING, ESPECIALLY SINGLE-ROW DEEP GROOVE ROLLING BEARING

FIELD OF THE INVENTION

The invention relates to a radial rolling bearing which can be realized particularly advantageously in single-row deep groove ball bearings for mounting the main shaft in motor vehicle shift transmissions or for mounting tensioning rollers within the secondary drive of internal combustion engines.

BACKGROUND OF THE INVENTION

A person skilled in the art of rolling bearing technology is generally familiar with the fact that single-row deep groove ball bearings are rigid, non-dismantlable radial rolling bearings which are characterized primarily in that their radial and axial load capacity is equally high, and in that, on account of their low friction, they have the highest speed limits of all bearing types. Said deep groove ball bearings have been known for a long time and are composed substantially of an outer bearing ring and an inner bearing ring and of a number of balls, which are arranged between the bearing rings, as rolling bodies, which are guided at uniform intervals with respect to one another by means of a bearing cage in in each case groove-shaped ball raceways in the inner side of the outer bearing ring and in the outer side of the inner bearing ring. The balls are introduced into radial ball bearings of said type by means of the eccentric assembly process known from DE 168 499, in which the two bearing rings are arranged eccentrically with respect to one another and the free space between the bearing rings which is generated in this way is filled with balls, which are subsequently distributed with a uniform spacing to one another on the pitch circle of the ball raceways.

In practice, however, it has been found that deep groove ball bearings of said type are nevertheless limited in terms of the load capacity of the bearing on account of the small maximum number of balls which can be installed, which is dependent on the dimensions of the inner and of the outer bearing ring and on the ball diameter. In the past, several solutions have therefore been proposed, the aim of which has been to obtain an increase in the load capacity of deep-groove ball bearings by increasing the number of balls.

One such option for increasing the number of rolling bodies in a radial rolling bearing is known for example from DE 43 34 195 A1. In said radial rolling bearing, which is embodied as a single-row deep groove ball bearing, the rolling bodies are however formed not by balls but by so-called spherical disks which are formed with two side surfaces, which are flattened symmetrically from a spherical basic shape and which are arranged parallel to one another. Here, the width of said spherical disks between their side surfaces is smaller than the spacing between the inner side of the outer bearing ring and the outer side of the inner bearing ring, such that when filling the bearing, the spherical disks can be inserted into the bearing through the spacing between the inner ring and outer ring and can then be rotated through 90° into the raceways of the bearing rings. Since it is possible with this assembly method to obtain smaller spacings between the individual rolling bodies, it is therefore possible for a higher overall number of rolling bodies to be inserted into the radial rolling bearing. However, in order to prevent contact between the rolling bodies and self-rotation of the rolling bodies transversely with respect to the running direction during operation of the bearing, said rolling bearings are also held at uniform intervals with respect to one another and guided axially in a bearing cage. Here, one of the proposed cage designs is a bearing cage which is composed of two ring halves and in which depressions are formed into each of the ring halves corresponding in each case to the number of spherical disks, which depressions engage into complementary central depressions in the side surfaces of the spherical disks. Here, the depressions in the side surfaces of the spherical disks are connected to one another by means of a central passage bore through which the two ring halves are connected to one another by means of rivets, such that the spherical disks are firmly fixed with respect to one another in the circumferential direction. Between the depressions, the two ring halves of the bearing cage each have sections which run straight along the side surfaces of the spherical disks and which, in interaction with the rivets which serve as rolling axles of the spherical disks, serve to prevent self-rotation of the rolling bodies transversely with respect to their running direction.

It has however proven to be disadvantageous that a bearing cage of said design does not make allowance for the entire kinematic behavior of the rolling bodies, which are embodied as spherical disks, which occurs under different bearing loadings, and therefore said bearing cage would appear to be unsuitable for special rolling bodies of said type. For example, it was determined that spherical disks as rolling bodies in radial rolling bearings run in a stable fashion in their rolling body raceways without tilting movements on account of the occurring centrifugal effect, and require no axial guidance by the bearing cage. However, if the bearing speed falls below a permitted minimum speed, a so-called tumbling effect occurs, in which the spherical disks tend to roll in their raceways in a sinusoidal fashion transversely with respect to the running direction. Here, contact occurs between the raceway edges of the spherical disks and the straight sections of the two ring halves of the bearing cage, as a result of which friction heat is generated to such an extent that the operating temperature in the radial rolling bearing rises. Here, the friction between the spherical disks and the bearing cage can become so intense that the permissible operating temperature of the bearing is exceeded and the required lubricating film between the spherical disks, the bearing cage and the bearing rings becomes locally separated or the lubricant is partially burned, such that the bearing cage is destroyed and the bearing fails prematurely. It was likewise found that, with a bearing cage of said type, a similar effect which likewise leads to its destruction occurs in that it is not possible for the spherical disks, on account of their mounting between the two ring halves on the rivets of the bearing cage, to be aligned to the respective pressure angle of the radial rolling bearing under mixed radial and axial loading of the radial rolling bearing. As the spherical disks seek to self-align to the pressure angle of the radial rolling bearing under such loadings of the radial rolling bearing, contact likewise occurs between the side surfaces of the spherical disks and the straight sections of the ring halves of the bearing cage, and contact occurs between the central passage bore in the spherical disks and the rivets of the bearing cage, such that excess friction heat was generated in the radial rolling bearing under such conditions too. Finally, a bearing cage of said type for spherical disks has also proven to be disadvantageous with regard to the production costs of radial rolling bearings fitted with such bearing cages, since the production of said bearing cage, and in particular the assembly of said bearing cage which must take place into the fitted bearing by means of rivets, is relatively complex.

OBJECT OF THE INVENTION

Proceeding from the explained disadvantages of the known prior art, the object on which the invention is based is therefore that of designing a radial rolling bearing, in particular deep-groove rolling bearing which is formed with a bearing cage which is simple and cost-effective to produce and with which, firstly, axial guidance of the rolling bodies which are embodied as spherical disks is ensured, and secondly, friction-heat-generating contact between the spherical disks and the bearing cage can be prevented even at low bearing speeds and/or under mixed axial and radial bearing loading.

DESCRIPTION OF THE INVENTION

According to the invention, said object is achieved with a radial rolling bearing in that the bearing cage has individual cage pockets for each rolling body, which cage pockets surround said rolling bodies on a pitch circle line and in which the rolling bodies, by means of at least two low-friction lines of contact between their side surfaces and the longitudinal webs of the cage pockets, firstly have axial guidance between the bearing rings and secondly are formed with a defined degree of freedom for self-alignment to the pressure angle of the radial rolling bearing.

Preferred embodiments and advantageous refinements of the radial rolling bearing embodied according to the invention are described in the subclaims.

Preferably, central depressions are formed into the side surfaces of the rolling bodies, which provide an additional lubricant reservoir for the radial rolling bearing. Said central depressions are preferably formed in the manner of circular flat recesses, from which the lubricant, which is filled in during the assembly of the bearing, automatically flows out into the bearing interior space, which is preferably sealed off by means of lateral sealing rings, under centrifugal force during operation of the bearing. At the same time, said depressions have the advantage that, as a result, the mass center of gravity of the rolling bodies is moved radially outward toward their running surfaces, and the running properties of the rolling bearing are therefore significantly improved.

A further feature of the radial rolling bearing designed according to the invention is that the lines of contact between the side surfaces of the rolling bodies and the longitudinal webs of the cage pockets can preferably be produced by means of axial wedge-shaped depressions which are formed longitudinally centrally into the longitudinal webs and which extend over the width of the side surfaces of the rolling bodies. During bearing operation, said wedge-shaped depressions are not in permanent contact with the side surfaces of the rolling bodies, but in the event of guidance, are in guiding contact with said side surfaces each at two points. Furthermore, it is advantageous for the resulting wedge edge on the wedge-shaped depressions to be of rounded design in order to prevent premature wear of said wedge edge.

According Additionally, the radial rolling bearing according to the invention is also characterized in that the transverse webs, which are formed so as to be domed corresponding to the radii of the running surfaces of the rolling bodies, of the cage pockets extend at both sides beyond said running surfaces in such a way that the longitudinal webs, which are connected to said transverse webs by means of rounded transition regions, of the cage pockets are arranged with a spacing to the side surfaces of the rolling bodies. The arrangement of the longitudinal webs of the cage pockets spaced apart from the side surface has the advantage that the rolling bodies simultaneously have an axial degree of freedom, which is delimited by the upper and lower sides of the wedge-shaped depressions in the longitudinal webs, of approximately 12.degree. to 18.degree., by means of which the rolling bodies can self-align to the pressure angle of the radial bearing under radial and axial bearing loading.

As further prerequisites for the realization of the axial degree of freedom of the rolling bodies, it is also proposed in an expedient refinement of the radial rolling bearing embodied according to the invention that the pitch circle of the bearing cage is smaller than the pitch circle of the radial rolling bearing, and that the longitudinal webs of the cage pockets have a maximum height of 35% of the diameter of the rolling bodies. As a result of the pitch circle of the bearing cage being smaller than the bearing pitch circle, the rolling bodies are therefore surrounded below their longitudinal axes by the cage pockets, such that, in connection with the small height of the longitudinal webs of the cage pockets and the prescribed design of the cage pockets, there is sufficient movement clearance available for the rolling bodies to be able to adapt to the in each case present bearing loading without making contact with the bearing cage. Here, the rolling body width, which is delimited by the side surfaces of the rolling bodies, is at least 70% of the diameter of the rolling bodies, since such a width has been proven in practice with regard to the radial and axial load capacity of the bearing and corresponds approximately to the contact surface which the balls of conventional deep groove ball bearings also have with respect to their raceways in the bearing rings.

The features of the radial bearing designed according to the invention finally also contribute to the achievement of the object that the bearing cage is either formed as a punched, drawn, or embossed part, which can be produced without cutting, and is composed of a metal material, or as an injection-molded part composed of an engineering plastic or high-temperature-resistant plastic or, alternatively, of a fiber-composite plastic composed of fabric reinforcement and resin matrix. In terms of the metal materials, primarily steel, brass and aluminum have been proven to be particularly suitable, with which the bearing cage can additionally be coated entirely, or limited to its contact points with the rolling bodies, with functional coatings composed of hard material, chromite, oxide ceramics or molybdenum, or encapsulated with an engineering plastic. In contrast, suitable engineering plastics for the bearing cage are PA 66 or PA 46 with or without inclusions of glass fibers, while it is possible as high-temperature-resistant plastics to use for example PAEK, PEEK, TPI or PAI with suitable additives or inclusions of glass fibers. Said materials have proven to be particularly cost-effective in purchasing terms and also permit the use of more cost-effective production processes for the bearing cage, such that radial bearings formed with bearing cages of said type can be produced with low overall production costs.

The radial rolling bearing designed according to the invention therefore has the advantage over the radial rolling bearings known from the prior art that, as a result of the formation of the bearing cage with bearing pockets in which the rolling bodies are guided axially merely by means of two double lines of contact, the kinematic conditions in a radial bearing are taken into consideration in that said radial bearing has an axial guide for the rolling bodies, by means of which the tumbling movements, or tilting movements transversely with respect to the running direction, of the rolling bodies which occur below a permissible minimum speed no longer lead to friction heat and to an impermissible increase in the operating temperature of the radial rolling bearing. At the same time, the rolling bodies have, as a result of their line-of-contact guidance in the cage pockets, a sufficient degree of freedom in the axial direction, by means of which said rolling bodies can self-align to the pressure angle of the radial rolling bearing present under radial and axial bearing loading, without coming into contact with the bearing cage. Furthermore, a bearing cage of said type has also proven to be advantageous with regard to low production costs, since said bearing cage is of structurally simple design and can be produced from cost-effective materials and using cost-effective production and assembly processes.

BRIEF DESCRIPTION OF THE DRAWINGS

One preferred embodiment of the radial rolling bearing designed according to the invention is explained in more detail below with reference to the appended drawings, in which.

DETAILED DESCRIPTION OF THE DRAWINGS

Figure 1:
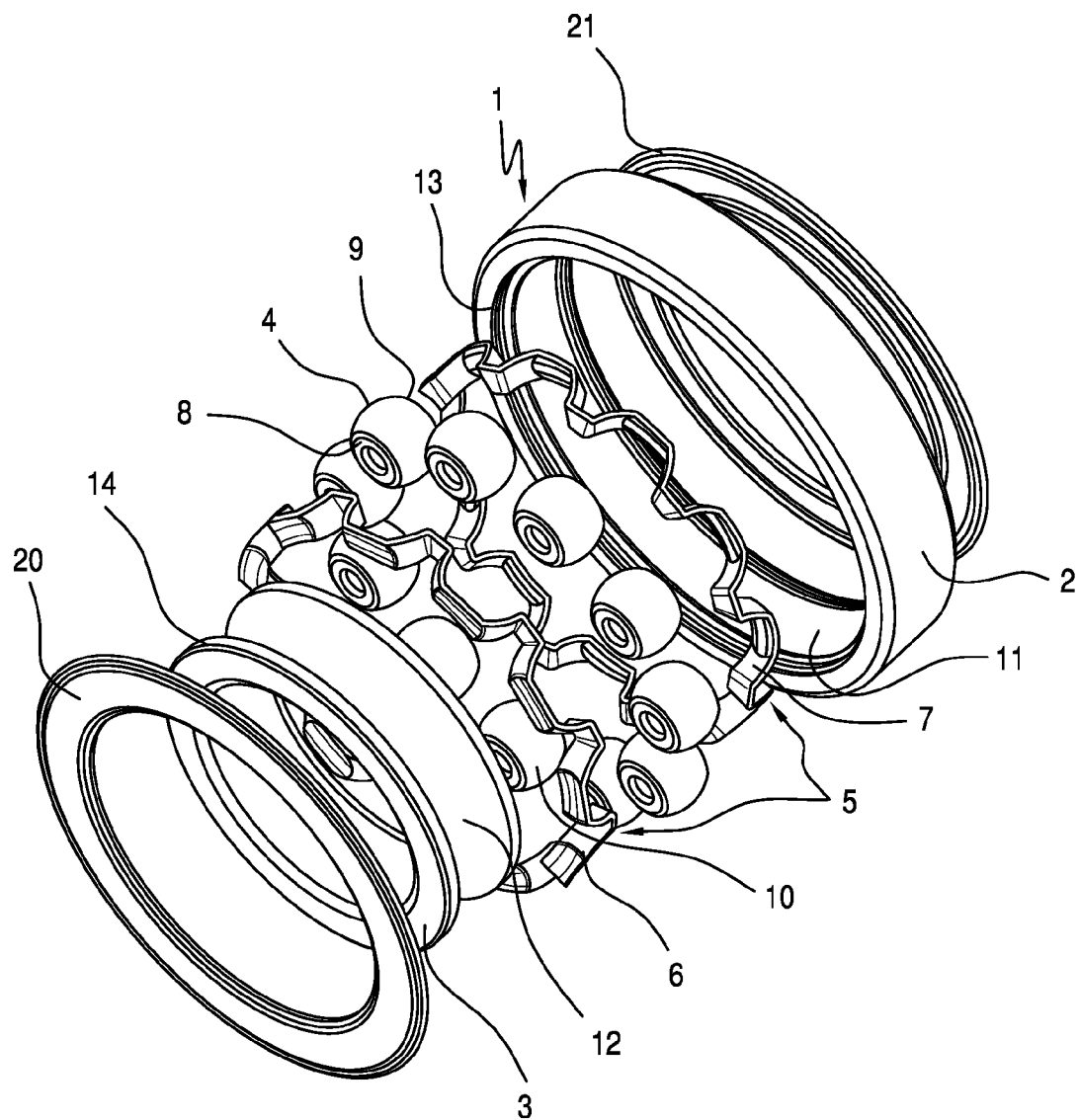
FIG. 1 shows a three-dimensional exploded illustration of a radial rolling bearing embodied according to the invention.

The three-dimensional exploded illustration as per FIG. 1 clearly shows a radial rolling bearing 1 which is embodied as a single-row deep groove rolling bearing which, similarly to known deep groove ball bearings, is composed substantially of an outer bearing ring 2 and an inner bearing ring 3 and of a plurality of rolling bodies 4 arranged between said bearing rings 2, 3. Here, as can be clearly seen, the rolling bodies 4 are formed by so-called spherical disks which have in each case two side surfaces 8, 9, which are flattened symmetrically from a spherical basic shape and are arranged parallel to one another, and which roll with their running surfaces 10 in two groove-shaped raceways 11, 12 which are formed into the inner side 13 of the outer bearing ring 2 and into the outer side 14 of the inner bearing ring 3. Furthermore, the rolling bodies 4 are held at uniform intervals with respect to one another in the circumferential direction by means of a bearing cage 5 which is composed of two ring halves 6, 7, the design of which bearing cage 5 is the subject matter of the following description.

Figure 2:
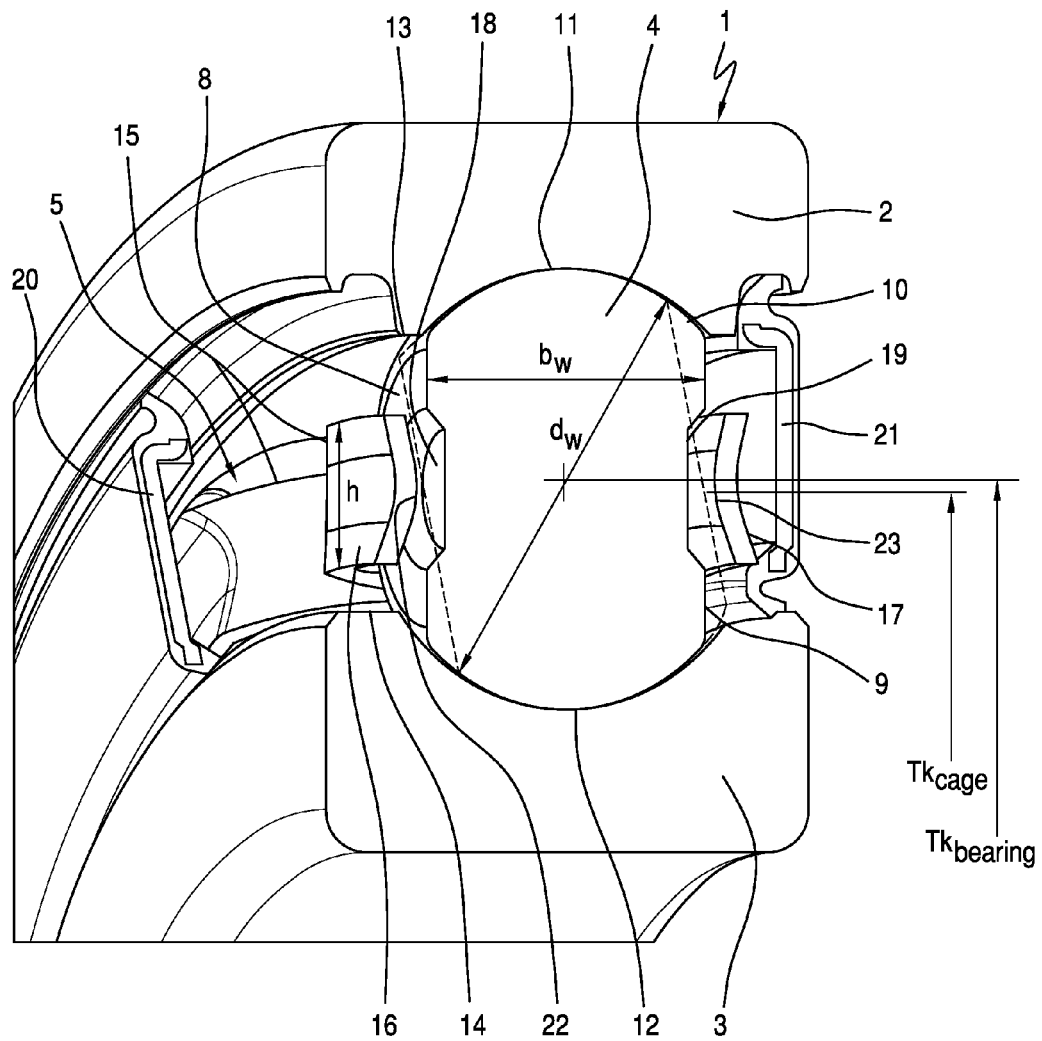
FIG. 2 shows an enlarged three-dimensional illustration of a cross section through a radial rolling bearing embodied according to the invention.
Figure 3:
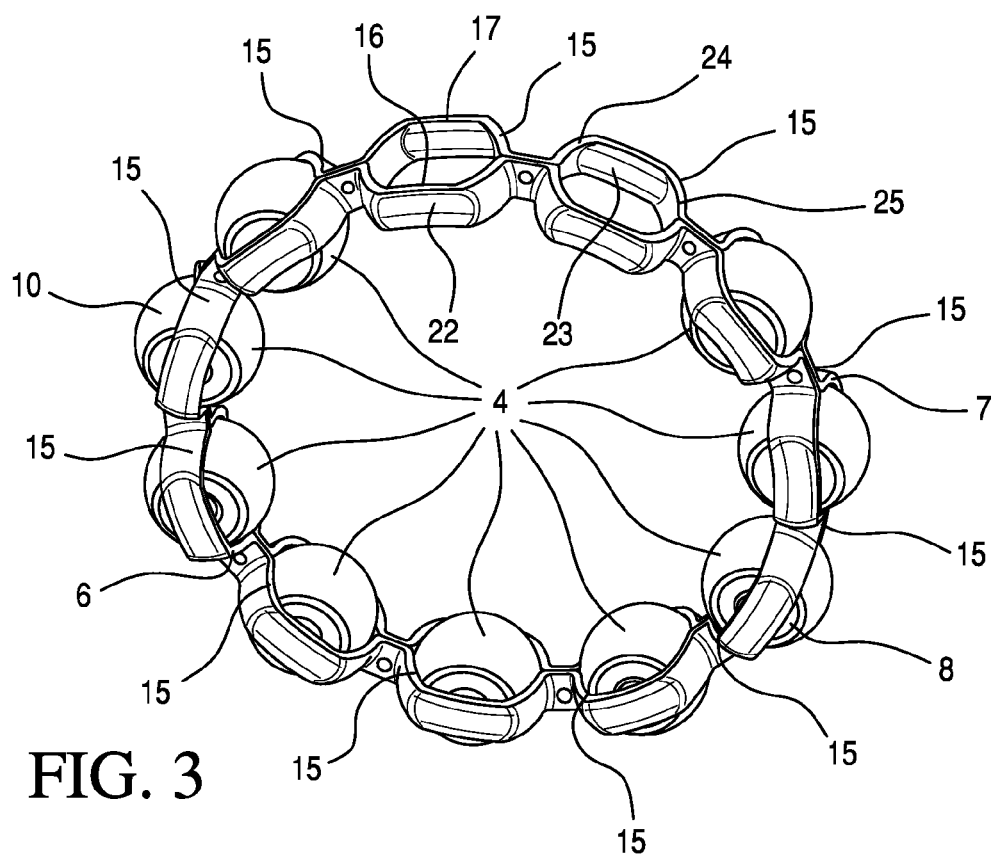
FIG. 3 shows a three-dimensional detail illustration of the bearing cage of a radial rolling bearing embodied according to the invention.

Viewing FIGS. 2 and 3 together, it can be clearly seen that, according to the invention, the bearing cage 5 has individual cage pockets 15 for each rolling body 4, which cage pockets 15 surround said rolling bodies 4 on a pitch circle line and in which cage pockets 15 the rolling bodies 4, by means of at least two low-friction lines of contact between their side surfaces 8, 9 and the longitudinal webs 16, 17 of the cage pockets 15, are guided axially between the bearing rings 2, 3. Here, as can be seen from FIG. 4, central depressions 18, 19 are formed into the side surfaces 8, 9 of the rolling bodies 4, which depressions 18, 19 are provided as an additional lubricant reservoir for the radial rolling bearing 1 and by means of which depressions 18, 19 the mass center of gravity of the rolling bodies 4 is simultaneously moved radially outward toward their running surfaces 10. Said central depressions 18, 19 are formed in the manner of circular flat recesses, from which the lubricant, which is filled in during the assembly of the bearing, automatically flows out into the bearing interior space, which is sealed off by means of lateral sealing rings 20, 21, under centrifugal force during operation of the bearing.

Figure 4:
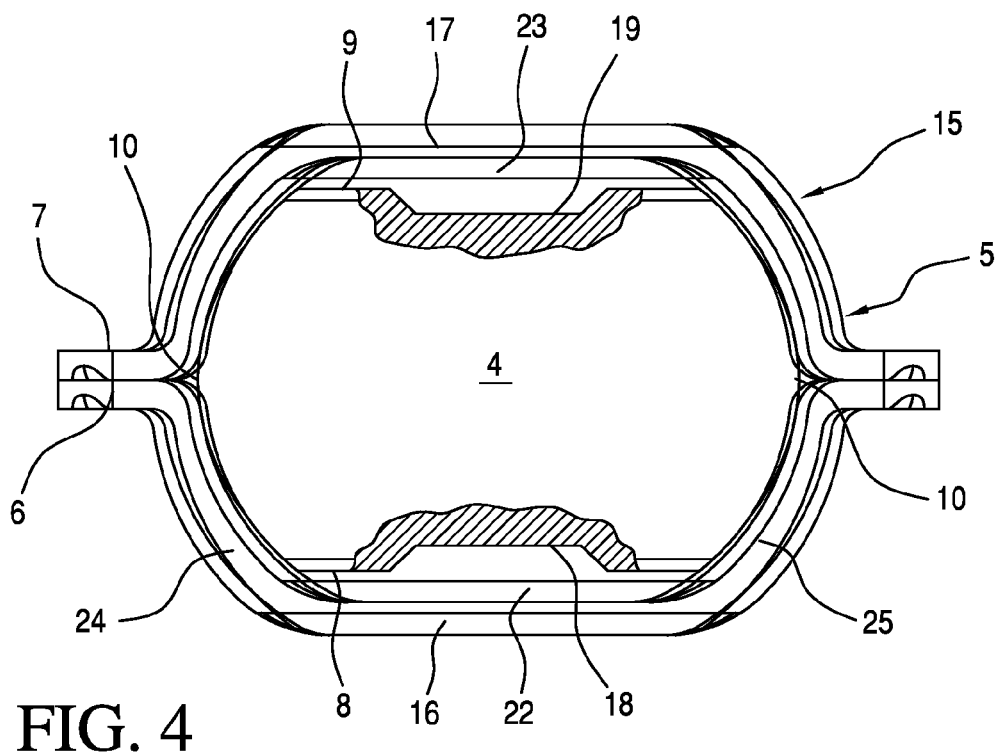
FIG. 4 shows a detail illustration of a cage pocket of the bearing cage of a radial rolling bearing embodied according to the invention.

It can also be seen in FIGS. 3 and 4 that the lines of contact between the side surfaces 8, 9 of the rolling bodies 4 and the longitudinal webs 16, 17 of the cage pockets 15 are produced by means of axial wedge-shaped depressions 22, 23 which are formed longitudinally centrally into the longitudinal webs 16, 17 and which extend over the width of the side surfaces 8, 9 of the rolling bodies 4 and which, by means of the depressions 18, 19 in the side surfaces 8, 9 of the rolling bodies 4, are in friction-reduced guiding contact with the latter in each case at two points. The transverse webs 24, 25, which are formed so as to be domed corresponding to the radii of the longitudinal and transverse radii of the running surfaces 10 of the rolling bodies 4, of the cage pockets 15 extend at both sides beyond said running surfaces 10, as can be clearly seen here, in such a way that the longitudinal webs 16, 17, which are connected to said transverse webs 24, 25 by means of rounded transition regions, of the cage pockets 15 are arranged with a spacing to the side surfaces 8, 9 of the rolling bodies 4. Said arrangement of the longitudinal webs 16, 17 of the cage pockets 15 spaced apart from the side surfaces 8, 9 of the rolling bodies 4 has the effect here that the rolling bodies 4 have, at both sides, a degree of freedom, which is delimited by the upper and lower sides of the wedge-shaped depressions 22, 23 in the longitudinal webs 16, 17 and which is indicated in FIG. 2 by dashed lines, of approximately 12° to 18° for self-alignment to the pressure angle of the radial bearing 1 under radial and axial bearing loading.

Furthermore, it is also illustrated in FIG. 2 that, as a further prerequisite for said degree of freedom of the rolling bodies 4, the pitch circle $Tk_{cage}$ of the bearing cage 5 is smaller than the pitch circle $Tk_{bearing}$ of the radial rolling bearing 1, such that the rolling bodies 4 are surrounded below their longitudinal axes by the cage pockets 15 of the bearing cage 5. In this context, the longitudinal webs 16, 17 of the cage pockets 15 have a maximum height h of 35% of the diameter $d_w$ of the rolling bodies 4, and the rolling body width $b_w$, which is delimited by the side surfaces 8, 9 of the rolling bodies 4, is at least 70% of the diameter $d_w$ of the rolling bodies 4. It can also be seen from the drawings, merely by indication, that the bearing cage 5 is formed as a punched, drawn, embossed part, which is produced without cutting, composed of a steel sheet, the ring halves 6, 7 of which bearing cage 5 are connected to one another by means of induction welding and which bearing cage 5 is coated, limited to its contact points with the rolling bodies 4, with a functional coating composed of chromite in order to reduce wear.

| List of reference symbols | |
|---|---|
| 1 | Radial rolling bearing |
| 2 | Outer bearing ring |
| 3 | Inner bearing ring |
| 4 | Rolling bodies |
| 5 | Bearing cage |
| 6 | Ring half of 5 |
| 7 | Ring half of 5 |
| 8 | Side surface of 4 |
| 9 | Side surface of 4 |
| 10 | Running surfaces of 4 |
| 11 | Raceway of 2 |
| 12 | Raceway of 3 |
| 13 | Inner side of 2 |

-continued

List of reference symbols

| | |
|---|---|
| 14 | Outer side of 3 |
| 15 | Cage pockets |
| 16 | Longitudinal web of 15 |
| 17 | Longitudinal web of 15 |
| 18 | Depression in 8 |
| 19 | Depression in 9 |
| 20 | Sealing ring |
| 21 | Sealing ring |
| 22 | Wedge-shaped depression in 16 |
| 23 | Wedge-shaped depression in 17 |
| 24 | Transverse web of 15 |
| 25 | Transverse web of 15 |
| $Tk_{cage}$ | Pitch circle of 5 |
| $Tk_{bearing}$ | Pitch circle of 1 |
| h | Height of 18, 19 |
| $d_w$ | Diameter of 4 |
| $b_w$ | Width of 4 |

The invention claimed is:

1. A radial rolling bearing, comprising:
an outer bearing ring;
an inner bearing ring; and
a plurality of rolling bodies which are arranged between the outer bearing ring and the inner bearing ring and which are held at uniform intervals with respect to one another in a circumferential direction by means of a bearing cage which is composed of two ring halves, with the rolling bodies being formed by spherical disks which have in each case two side surfaces, which are flattened symmetrically from a spherical basic shape and are arranged parallel to one another, and which roll with running surfaces in two groove-shaped raceways which are formed into an inner side of the outer bearing ring and into an outer side of the inner bearing ring,
wherein the bearing cage has individual cage pockets for each of the rolling bodies, the cage pockets surround the rolling bodies on a pitch circle line and in the cage pockets the rolling bodies, by means of at least two low-friction lines of contact between side surfaces and longitudinal webs of the cage pockets, are firstly axially guided between the bearing rings and are secondly formed with a defined degree of freedom for self-alignment to a pressure angle of the radial rolling bearing,
wherein central depressions are formed in the side surfaces of the rolling bodies, providing a lubricant reservoir for the radial rolling bearing and by means of which depressions a mass center of gravity of the rolling bodies can simultaneously be moved radially outward toward the running surfaces, and
wherein axial wedge-shaped depressions are formed in the longitudinal webs of the cage pockets, extend over an entire width of the side surfaces of the rolling bodies and are in guiding contact with the side surfaces of the rolling bodies at two points each so as to prevent penetration by the axial wedge-shaped depressions into the central depressions of the rolling bodies.

2. The radial rolling bearing as claimed in claim 1, wherein transverse webs of the cage pockets, which are domed to correspond to radii of the running surfaces of the rolling bodies, extend at both sides beyond the running surfaces in such a way that the longitudinal webs of the cage pockets, which are connected to the transverse webs by means of rounded transition regions, are arranged with a spacing to the side surfaces of the rolling bodies.

3. The radial rolling bearing as claimed in claim 2, wherein the rolling bodies, as a result of the longitudinal webs of the cage pockets being spaced apart from the side surfaces, have, at both sides, an axial degree of freedom, which is delimited by upper sides and lower sides of the wedge-shaped depressions in the longitudinal webs, of approximately 12° to 18° for self-alignment to the pressure angle of the radial bearing under radial and axial bearing loading.

4. The radial rolling bearing as claimed in claim 1, wherein the pitch circle of the bearing cage is smaller than the pitch circle of the radial rolling bearing, with the longitudinal webs of the cage pockets having a maximum height of 35% of a diameter of the rolling bodies, and with a rolling body width, which is delimited by the side surfaces of the rolling bodies, being at least 70% of the diameter of the rolling bodies.

5. The radial rolling bearing as claimed in claim 1, wherein the bearing cage is a punched part, a drawn part, or an embossed part, which can be produced without cutting, and is composed of a metal material which is coated entirely, or limited to contact points with the rolling bodies, with functional coatings composed of hard material, chromite, oxide ceramics or molybdenum, or is encapsulated with an engineering plastic.

6. The radial rolling bearing as claimed in claim 1, wherein the bearing cage is composed of an engineering plastic with or without inclusions of glass fibers, or of a high-temperature-resistant plastic, with suitable additives or inclusions of glass fibers, or of a fiber-composite plastic composed of fabric reinforcement and resin matrix.

* * * * *